United States Patent [19]
Xu

[11] Patent Number: 5,459,613
[45] Date of Patent: Oct. 17, 1995

[54] LEAD GLASS COMPOSITION SERIES FOR GRADIENT GLASSES

[75] Inventor: Xiaojie Xu, Tucson, Ariz.

[73] Assignee: LightPath Technologies, Inc., Tucson, Ariz.

[21] Appl. No.: 195,581

[22] Filed: Nov. 24, 1993

[51] Int. Cl.[6] ............................................. G02B 13/20
[52] U.S. Cl. ....................... 359/653; 359/652; 359/654
[58] Field of Search ................................. 359/653, 652, 359/654; 65/30.13

[56] References Cited

U.S. PATENT DOCUMENTS

| | | | |
|---|---|---|---|
| 4,883,522 | 11/1989 | Hagerty et al. | 65/18 |
| 4,907,864 | 3/1990 | Hagerty et al. | 359/653 |
| 4,929,065 | 5/1990 | Hagerty et al. | 359/653 |
| 5,044,737 | 9/1991 | Blankenbecler | 359/653 |
| 5,200,858 | 4/1993 | Hagerty et al. | 359/652 |

Primary Examiner—Frank Gonzalez
Assistant Examiner—Evelyn A. Lester
Attorney, Agent, or Firm—Benman Collins & Sawyer

[57] ABSTRACT

A fused glass block having an axial gradient index of refraction profile between two opposed parallel surfaces, with a change in refractive index from one of the surfaces to the other ranging from about 0.04 to 0.47, is provided. The fused glass block has a change in thermal expansion coefficient from one of the surfaces to the other of less than about $3\times10^{-7}$ °C.$^{-1}$, has essentially no strain or birefringence therein, and has a smoothly varying refractive index profile from one of the surfaces to the other. The fused glass block is prepared from at least two pre-selected compositions of a lead-silicate glass series that has been discovered to provide the requisite properties.

6 Claims, 3 Drawing Sheets

LEAD GLASS COMPOSITION SERIES FOR GRADIENT GLASSES

TECHNICAL FIELD

The present application relates generally to glass articles having a gradient in their index of refraction, and, in particular, to novel lead-based glass compositions for providing such gradients.

BACKGROUND ART

Common optical elements such as lenses and prisms are formed from homogeneous masses of transparent materials. Thus, the properties of the material are homogeneous throughout the entire optical element. Although several optical elements from different materials can be cemented or otherwise assembled together to form a compound element, the properties of the material within each element of the compound device are still constant. Optical theorists have realized that the performance of optical systems could be made with optical properties such as index of refraction and other properties which vary in a pre-selected fashion from place to place within the optical element. Optical elements having an index of refraction which varies from place to place within the element are referred to as "gradient index" elements.

Various attempts have been made heretofore to manufacture gradient index elements. Certain small gradient index elements can be fabricated by exposing a uniform material to a leaching process in which one or more constituents are gradually removed by diffusion from the element into a leaching solution. The reverse approach of exposing the element to a bath or vapor containing an additive so that the additive diffuses into the element can also be used. These surface-based modification techniques require lengthy treatment at elevated temperatures and under controlled conditions to produce even a small gradient in the refractive index over a small region of the optical element adjacent its surface. Accordingly, these techniques have been largely limited to fabrication of very small optical elements such as optical fibers with very small gradients in index of refraction. Further, the gradient profile is limited to a Gaussian profile, being controlled by the diffusion kinetics.

U.S. Pat. Nos. 4,907,864; 4,883,522; and 4,929,065 of Hagerty et al and U.S. Pat. No. 5,044,737 of Blankenbecler disclose fundamental advances in the manufacture of gradient index optical elements. The disclosures of these patents are hereby incorporated herein by reference. These patents disclose the manufacture of optical elements by assembling starting materials of non-uniform composition to form a starting assemblage having different compositions at different locations in the assemblage. For example, glass plates, each of a different composition, may be stacked one atop the other to form the starting assemblage. In an analogous manner, the starting assemblage may include a mass incorporating glass frits or powders of various compositions arranged to that the different compositions are located at different points. The starting assemblage is then subjected to a diffusion process, typically at an elevated temperature, so as to fuse the various starting materials into a solid mass, commonly referred to as a "blank", which can either be used directly as an optical element, or, more preferably, ground to a desired shape or otherwise treated to fashion it into a finished optical element. During the diffusion process, certain constituents tend to diffuse from regions of the assemblage where the concentration is high to regions where the concentration is lower. Thus, after the diffusion process has operated for a finite time, the resulting blank has a smooth gradation in composition and hence has optical properties which vary smoothly from point to point within the blank. Because the processes taught by these patents do not depend upon diffusion to or from the surface of the blank, but rather involve formation of a large gradient within the bulk of the blank on the order of 0.08 and larger (also termed as a "macro-gradient"), they can be used to form blanks, and hence optical elements, of essentially unlimited size and with substantial gradients in optical properties. Further, the profile of the gradient may be pre-selected by judicious choice of compositions and thicknesses of plates or frits, resulting in, for example, linear, quadratic, cubic, and other profiles. Such profiles permit fabrication of optical elements in which spherical aberrations are internally corrected, without the need of external correcting elements, for example. Thus, the processes taught in these patents accordingly represent major advances in the art of fabricating gradient index optical elements, and provide gradient index optical elements which were not previously available.

Despite these major advances in the art, there remains a need for still further improvements. Prior lead-silicate glass series having, for example, an index of refraction ranging from about 1.563 to 1.807, evidence a mismatch in thermal expansion coefficient after diffusion, causing fracture during fabrication and wavefront distortions in the gradient glass element. Even though all these glasses initially have well-matched thermal expansion coefficients, the composition change due to the multi-component diffusion process apparently results in thermal expansion coefficient change which consequently causes a mismatch in the thermal expansion coefficient of the gradient glass element.

Thus, a series of compositions based on lead silicate is required which permit fabrication of a lens blank having a substantial change in the index gradient, yet with each glass composition possessing a thermal expansion coefficient that is substantially the same for each composition, even after diffusion. In this way, plates or frit of the compositions, when layered atop one another, may be subjected to the afore-mentioned diffusion process, annealed, and cooled without evidencing fracture or wavefront distortions. Such glasses would have essentially no strain or birefringence within the element.

DISCLOSURE OF INVENTION

In accordance with the invention, a fused glass block having an axial gradient index of refraction profile between two opposed parallel flat surfaces, with a change in refractive index from one of the surfaces to the other ranging from about 0.04 to 0.47, is provided. The fused glass block has a change in thermal expansion coefficient from one of the surfaces to the other of less than about $3 \times 10^{-7}$ °C.$^{-1}$, has essentially no strain or birefringence in the glass block after diffusion, and has a smoothly, or gradually, varying refractive index profile from one of the surfaces to the other.

The fused glass block of the invention is fabricated from at least two plates of pre-chosen lead-silicate glass compositions, which are fused together and annealed in the manner taught by U.S. Pat. No. 4,929,065. Alternatively, at least two layers of frit of average particle size of 0.1 to 10 mm may be fused together and annealed.

Each glass composition has a composition that is within the following range: about 45 to 78 wt % $SiO_2$, 0 to about 55 wt % PbO, 0 to about 2.5 wt % $B_2O_3$, 0 to about 11 wt % $K_2O$, 0 to about 7 wt % $Na_2O$, and 0 to about 9 wt % CaO.

positions: refractive index ($n_d$), thermal expansion coefficient ($\alpha$), glass transition temperature ($T_g$), and density ($\rho$).

TABLE I

Composition in Mole % and Selected Properties of Glasses of the Invention.

| Glass | Composition (mol %) | | | | | $n_d$ | $\alpha$, $\times 10^{-7}$ | $T_g$, °C. | $\rho$ g/cm³ |
|---|---|---|---|---|---|---|---|---|---|
| | $SiO_2$ | $B_2O_3$ | $K_2O$ | $Na_2O$ | PbO | | | | |
| 11 | 44.96 | | | | 55.04 | 1.974 | 98 | 395 | 6.455 |
| 10 | 48.36 | | 0.55 | | 51.00 | 1.926 | 97 | 395 | 6.107 |
| 9 | 50.62 | | 1.64 | 0.55 | 47.19 | 1.890 | 97 | 390 | 5.789 |
| 8 | 53.84 | | 2.70 | 1.62 | 41.83 | 1.833 | 96 | 400 | 5.350 |
| 7 | 58.11 | | 3.22 | 1.62 | 37.06 | 1.781 | 95 | 410 | 4.900 |
| 6 | 61.49 | | 4.26 | 2.13 | 32.13 | 1.733 | 96 | 415 | 4.550 |
| 5 | 64.80 | | 4.74 | 3.16 | 27.29 | 1.695 | 95 | 420 | 4.200 |
| 4 | 68.06 | | 5.22 | 4.18 | 22.54 | 1.655 | 95 | 420 | 3.900 |
| 3 | 70.92 | 1.02 | 6.20 | 5.16 | 16.70 | 1.613 | 95 | 445 | 3.458 |
| 2 | 74.67 | 1.02 | 7.15 | 6.13 | 11.02 | 1.572 | 96 | 450 | 3.071 |
| 1 | 78.37 | 2.02 | 7.07 | 7.06 | 5.45 | 1.538 | 96 | 470 | 2.731 |
| 0 | 73.50 | 2.50 | 11.00 | 4.00 | 9.00 CaO | 1.514 | 97 | 513 | 2.530 |

Specific compositions are disclosed that all have substantially the same thermal coefficient of expansion both before and after the fusion/diffusion process.

BEST MODES FOR CARRYING OUT THE INVENTION

Figure 1:
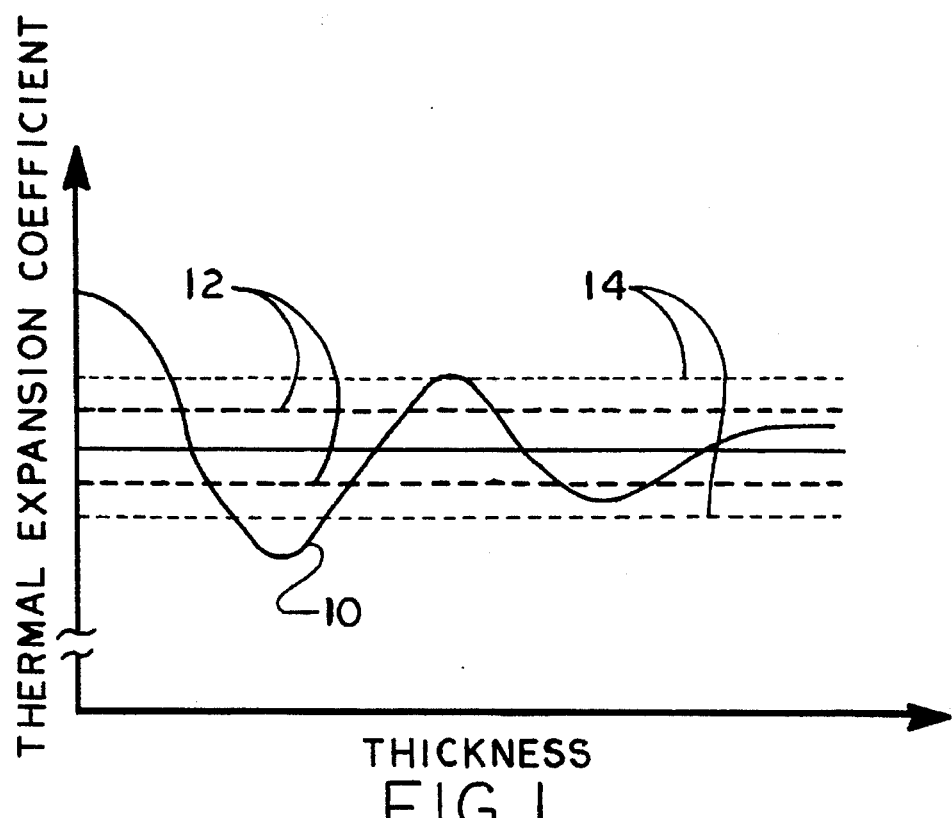
FIG. 1, on coordinates of thermal expansion coefficient and thickness, is a plot showing how the variation of thermal expansion coefficient for a prior art gradient index glass after diffusion exceeds an acceptable range, which will cause fracture, wavefront distortion, and birefringence.

In accordance with the invention, a series of lead-silicate optical glasses with refractive index ranging from about 1.51 to 1.98 is provided. The lead glasses all have very closely matched thermal expansion coefficients, as well as desirable glass transition temperature $T_g$, density, resistance to devitrification, and diffusion properties. The series of glasses permit fabrication of gradient index of refraction glass articles with desirable qualities. In the resulting fused glass block, the compositions have the same thermal coefficient of expansion after the diffusion process as before, making these glasses uniquely useful in forming lens blanks having preselected profiles in the index of refraction gradient.

The glass compositions and their properties are set forth in Table I below. As many as twelve compositions may be selected, or as few as any two compositions. Listed in Table I are the following properties for the respective glass com- The compositions in Table I may be varied by ±1% of the stated value and still be useful in the practice of the invention. Specifically, the compositions in Table I may be represented in the manner as shown in Table II, below.

TABLE II

Composition of Glasses in Mole %.

| Glass | Composition (mol %) | | | | | |
|---|---|---|---|---|---|---|
| | $SiO_2$ | $B_2O_3$ | $K_2O$ | $Na_2O$ | PbO | CaO |
| 11 | 45 | | | | 55 | |
| 10 | 48 | | 0.6 | | 51 | |
| 9 | 51 | | 1.6 | 0.6 | 47 | |
| 8 | 54 | | 2.7 | 1.6 | 42 | |
| 7 | 58 | | 3.2 | 1.6 | 37 | |
| 6 | 61 | | 4.3 | 2.1 | 32 | |
| 5 | 65 | | 4.7 | 3.2 | 27 | |
| 4 | 68 | | 5.2 | 4.2 | 23 | |
| 3 | 71 | 1 | 6.2 | 5.2 | 17 | |
| 2 | 75 | 1 | 7.2 | 6.1 | 11 | |
| 1 | 78 | 2 | 7.1 | 7.1 | 5.4 | |
| 0 | 73.5 | 2.5 | 11 | 4 | | 9 |

For glasses 8–11, a refining agent of $As_2O_3$ in an amount of about 0.3 wt % of the total glass composition is employed. $As_2O_3$ as a refining agent is the most suitable for the high index glasses, because it reduces color effects in the high lead-containing glasses. For glasses 0–5, a refining agent of $Sb_2O_3$ in an amount of about 0.3 wt % of the total glass composition is employed. $Sb_2O_3$ as a refining agent is most suitable for the low index glasses, because it eliminates bubbles during the diffusion process. For glasses 6–7, no refining agent is employed.

It will be appreciated by those skilled in this art that some of the glasses listed herein can be replaced by commercial optical glass. These commercial glasses are available from Schott Glass Company (Duryea, PA) and their designations are given in Table III below for the particular glasses that they can replace. However, it will be appreciated that attempts to use all commercial glasses causes undesirable fracture or even devitrification in the lens blank, and thus the lens blank should use either all of the glass compositions of the invention or a mix of glass compositions of the invention and commercial glass compositions. Without subscribing to any particular theory, it appears that the presence of $TiO_2$ and/or $ZrO_2$ in some of the commercial glasses causes devitrification. Further, many of these glasses do not have desirable $Na_2O/K_2O$ concentrations and ratios that have been optimized.

TABLE III

Commercial Designation of Replacement Glasses.

| Glass | Schott Designation | Refractive Index, $n_e$ |
|---|---|---|
| 11 | SF59 | 1.963 |
| 10 | SF58 | 1.927 |
| 8 | SF57 | 1.855 |
| 8 | SF6 | 1.814 |
| 5 | SF8 | 1.694 |
| 2 | LF7 | 1.578 |
| 1 | LLF2 | 1.543 |
| 0 | K7 | 1.513 |

Each composition of the present invention is fabricated by mixing the requisite powders and melting the mixture at the indicated melt temperature $T_m$ for about 4 to 5 hours. Specifically, the following components are preferably employed in the practice of the present invention: $SiO_2$, $PbSiO_3$, $PbO$, $Na_2CO_3$, $K_2CO_3$, $KNO_3$, $As_2O_3$, and $Sb_2O_3$. During the melting, glass is stirred to ensure the optical homogeneity of the glass. The melt is then cast into a suitable mold. The mold is placed in an annealing furnace which is preset to a temperature of about 10° C. above the glass transition temperature $T_g$ and held there for about 3 hours. The furnace is then cooled at a rate of about 0.5° C./min to about 300° C., at which time the furnace is shut off and the mold is allowed to cool to room temperature.

The cooled, annealed glass block is removed from the mold and sectioned into plates of desired thicknesses. The desired thickness depends on the particular gradient profile desired. The particular teachings of how to determine a particular thickness for a series of glass plates of different compositions are described elsewhere, and do not form a part of this invention; see, e.g., application Ser. No. 07/881,142, filed May 11, 1992, assigned to the predecessor of the present assignee.

Two or more plates of a desired thickness, each having a composition selected from the foregoing Table, are stacked in a mold and are subjected to diffusion. The diffusion process is carried out under substantially the same conditions of the afore-mentioned U.S. Pat. No. 4,929,065.

Alternatively, frit having an average particle size of about 0.1 to 10 mm is prepared from the glass block. Frits of different compositions are layered, with the glass having the highest index of refraction placed on the bottom of the mold, and with subsequent layers comprising glasses having successively lower index of refraction stacked up. The stack is then heated to the appropriate diffusion temperature. Details of this process are disclosed in application Ser. No. 08/163861, filed Dec. 8, 1993.

Employing the teachings of the present invention results in a substantially constant thermal expansion coefficient from one layered composition to the next. This means that there is a low $\Delta\alpha$ of the glass plates prior to diffusion to form the fused glass block. By a "low" $\Delta\alpha$ is meant that the variation in thermal expansion coefficient is no greater than about $3\times10^{-7}$ °C.$^{-1}$ from the outer surface of the bottom plate to the outer surface of the top plate.

Further, following diffusion, the $\Delta\alpha$ remains low. Thus, there is essentially no change in the thermal expansion coefficient as a result of diffusion. In contrast, many glass compositions used in the past to form gradient index fused glass blocks had a particular thermal expansion coefficient prior to diffusion and a different thermal expansion coefficient following diffusion.

As a consequence of employing at least any two of the foregoing disclosed compositions, the fused glass block evidences essentially no strain or birefringence in the block.

FIG. 1 schematically depicts the thermal expansion coefficient for a prior art gradient index glass after diffusion. The variation of thermal expansion coefficient with thickness, shown for Curve 10, is seen to exceed the acceptable ranges of birefringence (lines 12) and stress-break-down (lines 14). As a result of exceeding these ranges, fracture, wavefront distortion, and birefringence are observed.

Figure 2:
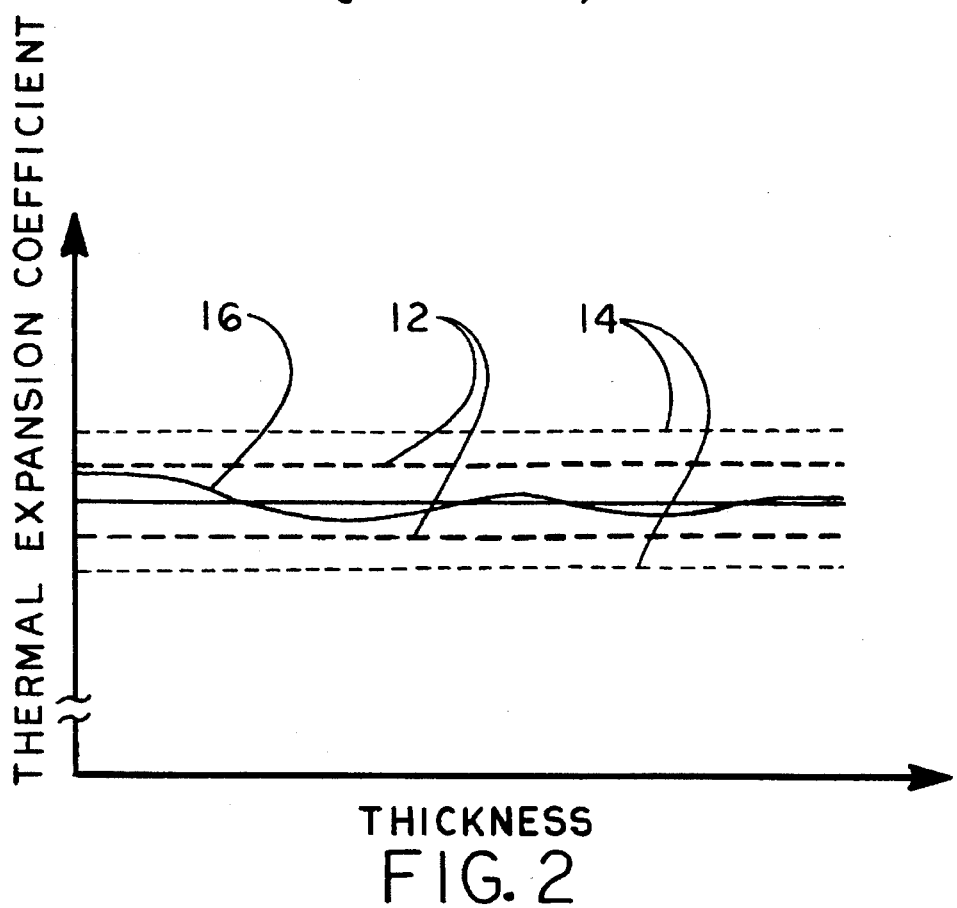
FIG. 2 is a plot, on the same coordinates as FIG. 1, for a gradient index glass in accordance with the invention after diffusion.

In contrast, FIG. 2 schematically depicts the thermal expansion coefficient for a gradient index glass of the present invention after diffusion. The variation of thermal expansion coefficient with thickness, shown for Curve 16, is seen to be within the acceptable range.

EXAMPLES

At least 25 glass compositions have been designed and melted. Among those glasses, twelve were chosen based on their compatibility with each other and their suitability for the fusion/diffusion process. The refractive index $n_e$ of these glasses span from 1.514 to 1.974, with an increment of about 0.02 to 0.04, as shown in Table I, above.

Extensive diffusion experiments were performed using these glasses to study their compatibility as well as their suitability for the fusion/diffusion process to make axial gradient glasses. The results of these experiments are detailed below.

Example 1

Glasses 6 to 11 were used. Frit of each composition was prepared, having an average particle size of about 1 to 10 mm. The glass type and the properties thereof are listed in Table IV, below. Also listed is the thickness of each layer of frit and the weight ("Wt.") of frit (calculated and actual) to provide a predetermined gradient in index of refraction. In this case, a linear profile, having a slope of 0.020 (mm$^{-1}$), was desired, with a change in refractive index from one surface to the opposite surface from 1.80 to 1.90 to provide a $\Delta n$ of 0.10.

TABLE IV

Glasses Used, Their Properties, and the Thickness and Weight of Frit Employed.

| Glass Type | Refr. Index | Density (g/cm$^3$) | Thickness (mm) | Calc. Wt. (g) | Actual Wt. (g) |
|---|---|---|---|---|---|
| 6 | 1.733 | 4.548 | 3.00 | 31.25 | 31.20 |
| 7 | 1.781 | 4.902 | 2.20 | 24.70 | 24.71 |
| 8 | 1.833 | 5.256 | 2.40 | 28.89 | 28.90 |
| 9 | 1.890 | 5.663 | 2.50 | 32.42 | 32.41 |
| 10 | 1.926 | 5.979 | 1.00 | 13.69 | 13.68 |
| 11 | 1.974 | 6.279 | 5.00 | 71.90 | 71.88 |
| Total | | | 16.10 | 202.85 | |

The frit was initially heated to 1,000° C. for 1 hour to melt the frit layers and then the temperature was reduced to 900° C. and held there for 40 hours to fuse the layers and diffuse the ionic species. The resulting fused glass block was then gradually cooled to room temperature.

Figure 3:
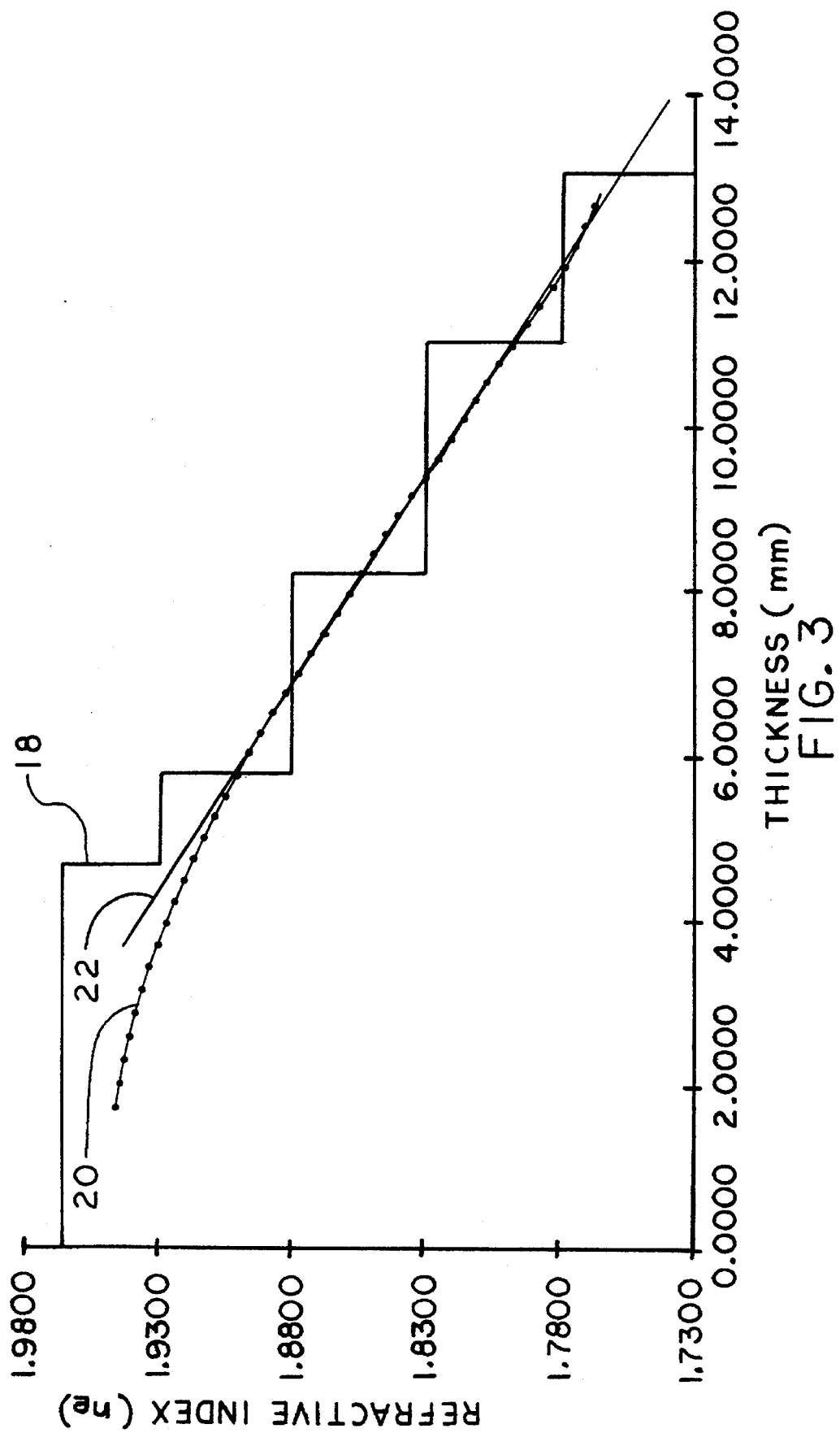
FIG. 3, on coordinates of refractive index ($n_e$) and thickness (in mm), is a plot of (a) the step index of six layered compositions within the scope of the invention prior to fusion/diffusion, (b) the measured gradient profile of the stack following fusion/diffusion, and (c) a fitted straight line.

There was no fracture and very little residual stress was observed in the glass. The profile of the index of refraction was measured and determined to be a good, smooth profile with a linear region of slope 0.020 (±0.0002) (mm$^{-1}$). The profile fit the design specification. FIG. 3 is a plot of (a) the initial step profile prior to diffusion (Curve 18), (b) the actual measured profile (Curve 20), and the fitted straight line (Curve 22), which has a calculated slope of −0.0198. The RMS transmission wave-front quality of this blank over a 26 mm clear aperture was 0.26 waves.

The success of making a lens from the lens blank fabricated above demonstrated that glasses 6 to 11 are very compatible with each other both thermally and as far as diffusion is concerned.

Example 2

Glasses 11, 8, and 6 were diffused at 900° C. for 100 hours to form a glass block having an axial gradient therethrough from top to bottom. Each layer was about 4 mm thick. After diffusion, on the top surface about 2 mm deep, a region of volatilization of possibly alkali caused wavefront distortion. The gradient glass maintained good integrity, no fractures, and very little residual thermal stress in the diffused glass. The gradient index profile was smooth and stepless.

Example 3

Glasses 9, 7, and 5 were diffused at 1,000° C. for 100 hours to form a glass block having an axial gradient therethrough from top to bottom. Each layer was about 4 mm thick. After diffusion, on the top surface about 2 mm deep, a region of volatilization of possibly alkali caused wavefront distortion. The gradient glass maintained good integrity, no fractures, and very little residual thermal stress in the diffused glass. The gradient index profile was smooth and stepless.

Example 4

Glasses 8, 6, and 4 were diffused at 1,000° C. for 100 hours to form a glass block having an axial gradient therethrough from top to bottom. Each layer was about 4 mm thick. After diffusion, on the top surface about 2 mm deep, a region of volatilization of possibly alkali caused wavefront distortion. The gradient glass maintained good integrity, no fractures, and very little residual thermal stress in the diffused glass. The gradient index profile was smooth and stepless.

Example 5

Glasses 8, 5, and 3 were diffused at 1,000° C. for 100 hours to form a glass block having an axial gradient therethrough from top to bottom. Each layer was about 4 mm thick. After diffusion, on the top surface about 2 mm deep, a region of volatilization of possibly alkali caused wavefront distortion. The gradient glass maintained good integrity, no fractures, and very little residual thermal stress in the diffused glass. The gradient index profile was smooth and stepless.

Example 6

Glasses 8, 5, and 2 were diffused at 1,000° C. for 100 hours to form a glass block having an axial gradient therethrough from top to bottom. Each layer was about 4 mm thick. After diffusion, on the top surface about 2 mm deep, a region of volatilization of possibly alkali caused wavefront distortion. The gradient glass maintained good integrity, no fractures, and very little residual thermal stress in the diffused glass. The gradient index profile was smooth and stepless.

Example 7

Glasses 8, 5, and 1 were diffused at 1,000° C. for 100 hours to form a glass block having an axial gradient therethrough from top to bottom. In this experiment, the goal was to verify the compatibility of these three glasses.

Figure 4:
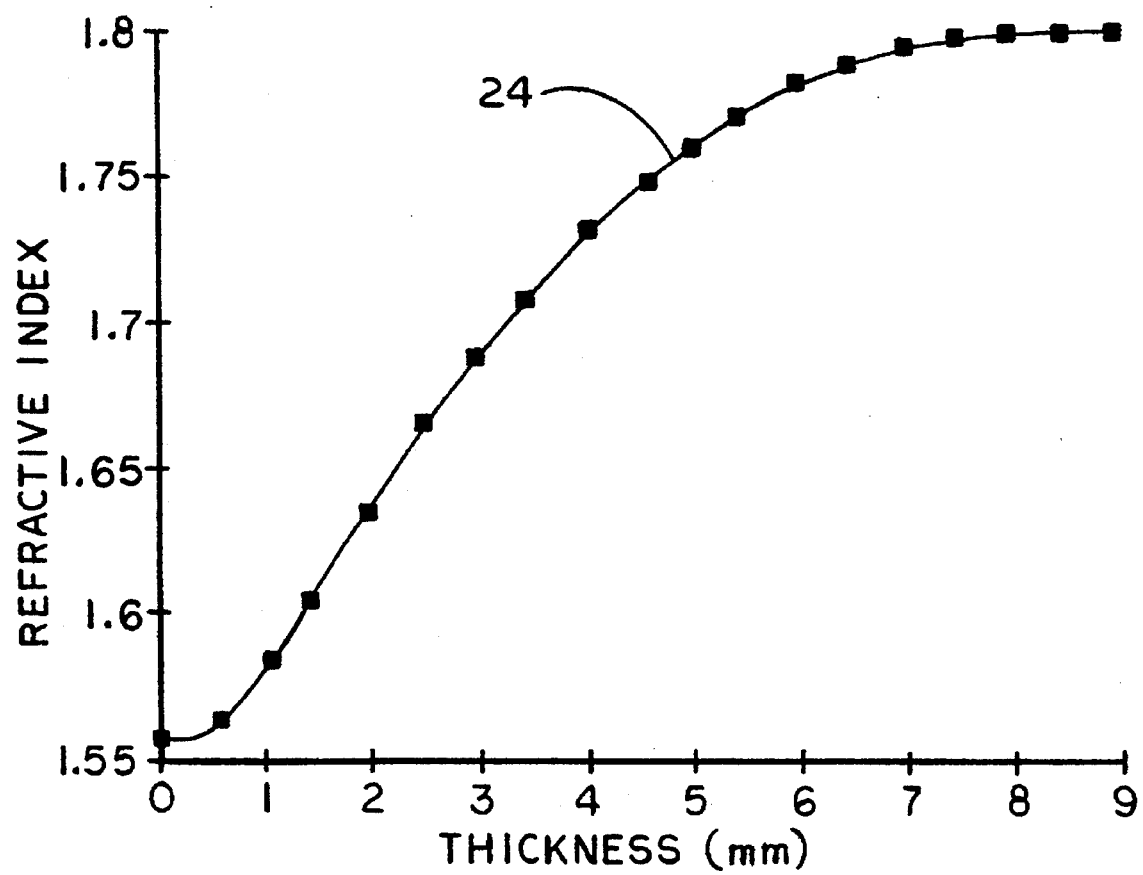
FIG. 4, on the same coordinates as FIG. 3, is a plot of the measured gradient profile of a lens blank comprising three layered compositions within the scope of the invention following fusion/diffusion.

Each layer was about 4 mm thick. After diffusion, on the top surface about 2 mm deep, a region of volatilization of possibly alkali caused wavefront distortion. Scattered crystallization on the top surface was also observed. However, the gradient glass maintained good integrity, no fractures, and very little residual thermal stress in the diffused glass. After removal of the top crystallized and distorted region, the gradient index profile was measured. The resulting curve (Curve 24) is depicted in FIG. 4. A very smooth, step-free gradient profile is observed.

Example 8

Glasses 8, 5, and 0 were diffused at 1,000° C. for 100 hours to form a glass block having an axial gradient therethrough from top to bottom. Each layer was about 4 mm thick. After diffusion, on the top surface about 2 mm deep, a region of volatilization of possibly alkali caused wavefront distortion. No crystallization on the top surface was observed. The gradient glass maintained good integrity, no fractures, and very little residual thermal stress in the diffused glass. The gradient index profile was smooth and stepless.

Example 9

Glasses 7, 5, 4, 3, 2, 1 and 0 were diffused at 1,100° C. for 100 hours to form a glass block having an axial gradient therethrough from top to bottom. The top and bottom layers were each about 4 mm thick; the other layers were about 2 mm thick. After diffusion, on the top surface about 2 mm deep, a region of volatilization of possibly alkali caused wavefront distortion. No crystallization on the top surface was observed. The gradient glass maintained good integrity, no fractures, and very little residual thermal stress in the diffused glass. The gradient index profile was smooth and stepless.

The following examples are illustrative of experiments using all commercial compositions.

Comparative Example 1

Schott glasses SF6 ($n_e$=1.814) and LLF6 ($n_e$=1.534) were diffused at 1,000° C. for 80 hrs in an attempt to form a gradient glass. Each layer was about 6 mm thick. After diffusion, the top layer completely crystallized and fractured from the rest of the glass. Strong residual thermal stress and birefringence were observed in the gradient glass. The gradient index profile in the high index portion of the glass was smooth and stepless.

Comparative Example 2

Schott glasses SF6 ($n_e$=1.814) and $F_3$ ($n_e$=1.617) were diffused at 1,000° C. for 80 hrs in an attempt to form gradient glass. Each layer was about 6 mm thick. After diffusion, the top layer fractured from the rest of the glass. Residual thermal stress and birefringence in the gradient glass were observed. The gradient index profile in the high index portion of the glass was smooth and stepless.

Comparative Example 3

Schott glasses SF59, SF58, SF57, SF6, SF4, and SF1 were diffused at 900° C. for 40 hrs in an attempt to form gradient glass. The top and bottom layers were each about 4 mm thick, and the intermediate layers were each about 1.7 to 2.7 mm thick. After diffusion, the glass fractured between glass SF6 and SF4. Strong residual thermal stress and birefringence in the gradient glass were observed.

INDUSTRIAL APPLICABILITY

The fused glass block of the invention having an axial gradient index of refraction profile and essentially no strain or birefringence is expected to find use in the fabrication of optical elements.

Thus, there has been disclosed a fused glass block having an axial gradient index of refraction profile and essentially no strain or birefringence and a method for making the same. It will be readily apparent to those skilled in this art that various changes and modifications of an obvious nature may be made without departing from the spirit of the invention, and all such changes and modifications are considered to fall within the scope of the invention, as defined by the appended claims.

What is claimed is:

1. A fused glass block having an axial gradient index of refraction profile between two opposed parallel surfaces, with a change in refractive index from one of said surfaces to the other ranging from about 0.04 to 0.47, having a change in thermal expansion coefficient from one of said surfaces to the other of less than about $3\times10^{-7}$ °C.$^{-1}$, having essentially no strain or birefringence in said glass block, and having a smoothly varying refractive index profile from one of said surfaces to the other, wherein one of said surfaces has a first composition and the other of said surfaces has a second and different composition, said first and said second compositions each selected from the following table of compositions, with the percent listed for each component variable by ±1% of the stated value:

TABLE

Composition in Mole %.

| Glass | SiO$_2$ | B$_2$O$_3$ | K$_2$O | Na$_2$O | PbO | CaO |
|---|---|---|---|---|---|---|
| 11 | 45 | | | | 55 | |
| 10 | 48 | | 0.6 | | 51 | |
| 9 | 51 | | 1.6 | 0.6 | 47 | |
| 8 | 54 | | 2.7 | 1.6 | 42 | |
| 7 | 58 | | 3.2 | 1.6 | 37 | |
| 6 | 61 | | 4.3 | 2.1 | 32 | |
| 5 | 65 | | 4.7 | 3.2 | 27 | |
| 4 | 68 | | 5.2 | 4.2 | 23 | |
| 3 | 71 | 1 | 6.2 | 5.2 | 17 | |
| 2 | 75 | 1 | 7.2 | 6.1 | 11 | |
| 1 | 78 | 2 | 7.1 | 7.1 | 5.4 | |
| 0 | 73.5 | 2.5 | 11 | 4 | | 9. |

2. The fused glass block of claim 1 comprising at least one composition intermediate between said first and second compositions.

3. The fused glass block of claim 1 in which a refining agent consisting essentially of Sb$_2$O$_3$ is employed for any of the compositions constituting glasses 0–5.

4. The fused glass block of claim 3 wherein said refining agent is present in an amount of about 0.3 wt % of said composition.

5. The fused glass block of claim 1 in which a refining agent consisting essentially of As$_2$O$_3$ is employed for any of the compositions constituting glasses 8–11.

6. The fused glass block of claim 5 wherein said refining agent is present in an amount of about 0.3 wt % of said composition.

* * * * *